United States Patent
Wolf et al.

(10) Patent No.: US 12,536,895 B2
(45) Date of Patent: Jan. 27, 2026

(54) GENERATING AN EVENT DEVICE OPTIMIZATION ANALYSIS IN AN EVENT SYSTEM

(71) Applicant: Honeywell International Inc., Charlotte, NC (US)

(72) Inventors: Benjamin H. Wolf, Leicester (GB); Ronald Blewanus, Naaldwijk (NL); Michael Barson, Nuneaton (GB)

(73) Assignee: Honeywell International Inc., Charlotte, NC (US)

( * ) Notice: Subject to any disclaimer, the term of this patent is extended or adjusted under 35 U.S.C. 154(b) by 230 days.

(21) Appl. No.: 18/202,515

(22) Filed: May 26, 2023

(65) Prior Publication Data

US 2024/0395129 A1 Nov. 28, 2024

(51) Int. Cl.
 *G08B 29/18* (2006.01)
 *G08B 31/00* (2006.01)

(52) U.S. Cl.
 CPC ........... *G08B 29/185* (2013.01); *G08B 31/00* (2013.01)

(58) Field of Classification Search
 CPC .. A61B 5/7275; G05B 15/02; G05B 19/4155; G05B 23/0283; G06F 16/00; G06N 5/043; G06N 20/00; G06Q 10/06312; G06Q 10/08; G06Q 40/08; G07C 9/20; G08B 17/10; G08B 17/117; G08B 19/00; G08B 21/16; G08B 21/18; G08B 20/18; G08B 20/185; G08B 20/186; G08B 31/00; H04L 21/1895
 USPC .......................................................... 340/514
 See application file for complete search history.

(56) References Cited

U.S. PATENT DOCUMENTS

| | | | |
|---|---|---|---|
| 10,037,686 B1 | 7/2018 | Magyar et al. | |
| 10,553,085 B1 * | 2/2020 | Derickson | G08B 7/062 |
| 10,706,323 B1 * | 7/2020 | Liebman | G06N 20/00 |
| 10,832,564 B2 | 11/2020 | Subramanian et al. | |
| 2014/0281479 A1 * | 9/2014 | Gettings | G01N 33/0062 713/150 |
| 2017/0220718 A1 * | 8/2017 | Freeman | G06N 20/00 |

(Continued)

FOREIGN PATENT DOCUMENTS

| | | | | |
|---|---|---|---|---|
| CN | 2752757 Y | | 1/2006 | |
| CN | 109068255 A | * | 12/2018 | H04R 29/00 |

(Continued)

OTHER PUBLICATIONS

Adi, et al., "Automatic False-Alarm Labeling for Sensor Data"; Journal of The Korea Society of Computer and Information, vol. 24 No. 2, pp. 139-147, Feb. 2019 (9 pgs).

*Primary Examiner* — Stephen R Burgdorf
(74) *Attorney, Agent, or Firm* — Brooks, Cameron & Huebsch, PLLC (57) ABSTRACT

Devices, systems, and methods for generating an event device optimization analysis in an event system are described herein. In some examples, one or more embodiments include a computing device comprising a memory and a processor to execute instructions stored in the memory to receive building system information from a plurality of event devices of the event system in a facility, generate an event device optimization analysis via a machine-learning model using the building system information from the plurality of event devices, and cause the event device optimization analysis to be displayed via a user interface.

20 Claims, 4 Drawing Sheets

(56) References Cited

U.S. PATENT DOCUMENTS

| | | | |
|---|---|---|---|
| 2018/0075168 A1 | 3/2018 | Tiwari et al. | |
| 2020/0342748 A1* | 10/2020 | Tournier | G08B 13/19 |
| 2022/0260271 A1* | 8/2022 | Sikora | G05B 23/0283 |
| 2022/0315974 A1 | 10/2022 | Denelsbeck et al. | |
| 2024/0320870 A1* | 9/2024 | Malan | G05B 13/0265 |
| 2024/0330741 A1* | 10/2024 | Boufelja-Yacoubi | G06N 20/00 |

FOREIGN PATENT DOCUMENTS

| | | | |
|---|---|---|---|
| DE | 102021204640 A1 | 11/2022 | |
| WO | WO-2022040191 A1 * | 2/2022 | G08B 29/181 |
| WO | 2022174259 A1 | 8/2022 | |

\* cited by examiner

GENERATING AN EVENT DEVICE OPTIMIZATION ANALYSIS IN AN EVENT SYSTEM

TECHNICAL FIELD

The present disclosure relates to devices, systems, and methods for generating an event device optimization analysis in an event system.

BACKGROUND

Facilities, such as commercial facilities, office buildings, hospitals, campuses (e.g., including buildings and outdoor spaces), and the like, may have an event system that can be triggered during an event, such as an emergency situation (e.g., a fire) to warn occupants to evacuate. Such an event system may include an alarm system having a control panel and a number of event devices (e.g., sensors, sounders, pull stations, etc.) located throughout the facility (e.g., on different floors and/or in different rooms of the facility) that can perform an action when an event (e.g., a hazard event, a fault event, etc.) is occurring in the facility. In an example of an event, the number of event devices may provide a notification of the event to the occupants of the facility via alarms and/or other mechanisms.

DETAILED DESCRIPTION

Devices, systems, and methods for generating an event device optimization analysis in an event system are described herein. In some examples, one or more embodiments include a computing device comprising a memory and a processor to execute instructions stored in the memory to receive building system information from a plurality of event devices of the event system in a facility, generate an event device optimization analysis via a machine-learning model using the building system information from the plurality of event devices, and cause the event device optimization analysis to be displayed via a user interface.

A facility can utilize an event system in order to warn occupants of the facility of an emergency event, such as a fire. An event system can be a system of devices that operate to collect information about a facility and provide the collected information for analysis. Such an event system can also take actions based on the collected information, such as providing an audible and/or visible warning in an emergency event. For example, the event system can utilize event devices to warn occupants of the emergency event occurring in the space, such as a fire. As used herein, the term "event device" refers to a device that can receive an input relating to an event and/or generate an output relating to an event. Such event devices can be a part of the event system of a space in a facility/in the facility at large and can include devices such as fire sensors, smoke detectors, heat detectors, carbon monoxide (CO) detectors, or combinations of these; air quality sensors; interfaces; manual call points (MCPs); pull stations; input/output modules; aspirating units; and/or audio/visual devices (e.g., speakers, sounders, flashers, buzzers, microphones, cameras, video displays, video screens, etc.), relay output modules, among other types of event devices.

Detection states for detectors in the event devices of the event system are generally set when an event system is initially installed and/or commissioned in the facility. However, in some instances, the detectors may not be setup and commissioned with an appreciation for how the facility will operate when occupied by occupants.

Additionally, in some examples, some facilities may have a poor initial event system design. For example, alternative event device types and/or alternative engineering configurations may have not been considered in a poorly designed event system. Additionally, a poorly designed event system may not include feedback loops for determination of whether the correct event device types are utilized in the facility.

When detectors/event devices are not setup properly and/or a poor event system design occurs, various issues can arise. For example, the event system may not be able to properly reject potential nuisance events and/or false alarm events, whilst potentially delaying initiating alarms for a real emergency event.

The consequences of poor event system design and/or improperly selected and/or setup event devices can undermine occupants' faith in the event system if the event system detects too many unwanted events, such as nuisance events and/or false alarm events. However, incorrectly de-sensitizing the detectors in the event devices in the event system can inhibit the event system's ability to give early warning detection of real emergency events, which is critical for alerting occupants of the facility.

Generating an event device optimization analysis in an event system, according to the present disclosure, can allow for the optimization of detection states for detectors of event devices in the event system, as well as allow for generation of recommendations for alternative event device types and/or alternative engineering configurations for event devices in the facility, all based on real data from the facility. Such an approach can provide comprehensive analytical information for more active management of an event system in a facility, promoting safer and less costly event detection processes in the facility, as compared with previous approaches. Additionally, such an approach can reduce unnecessary responses to the facility from local emergency services due to false and/or nuisance events. Further, such an approach can provide occupants of the facility with better confidence in the event system, especially if a real emergency event occurs, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
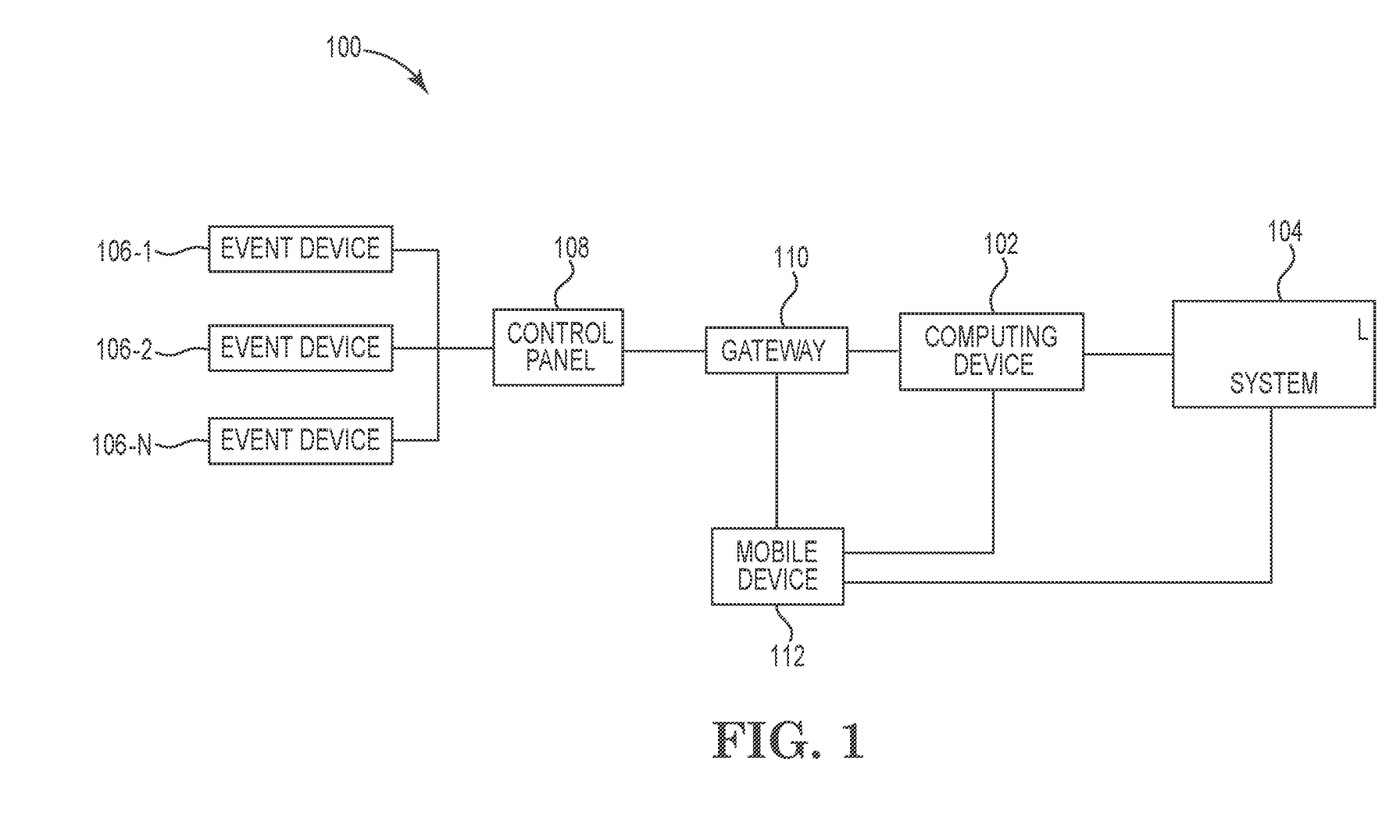
FIG. 1 is an example of a system for generating an event device optimization analysis in an event system, in accordance with one or more embodiments of the present disclosure.

FIG. 1 is an example of a system 100 for generating an event device optimization analysis in an event system, in accordance with one or more embodiments of the present disclosure. The system 100 can include a computing device 102, an environmental monitoring system (EMS) 104, event devices 106-1, 106-2, 106-N, a control panel 108, a gateway 110, and a mobile device 114.

As mentioned above, the system 100 can be included in a facility, a space in a facility, etc. The system 100 can include a device/series of devices in order to detect events and/or process and/or analyze the detected events to determine whether to generate an alarm for occupants of the facility.

For example, the system 100 can include event devices 106-1, 106-2, 106-N (referred to collectively as event devices 106). The event devices 106 can be devices to detect an event and transmit the detected event for processing and/or analysis. As mentioned above, the event devices 106 can include, for example, cameras, motion sensors, fire sensors, smoke detectors, heat detectors, carbon monoxide (CO) detectors, fixed gas and/or flame detectors, aspirating smoke detectors, beam smoke detectors, or combinations of these; air quality sensors; interfaces; manual call points (MCPs); pull stations; input/output modules; aspirating units; sprinkler controls; and/or audio/visual devices (e.g., speakers, microphones, cameras, video displays, video screens, etc.), relay output modules, among other types of event devices.

Such event devices 106 can include detectors. As used herein, the term "detector" refers to a device to measure events and/or changes in its environment and transmit the detected events and/or changes for processing and/or analysis. For example, an event device 106-1 can be a smoke detector and can include a detector that measures amounts of smoke in a sample.

The system 100 can further include a control panel 108. The control panel 108 can be utilized to control the various event devices 106 included in the system 100.

The control panel 108 can be connected to the event devices 106 and to a gateway 110. The gateway 110 can be a device (e.g., a building system gateway) that provides a communication link between the control panel 108 and other devices, such as the computing device 102 and the mobile device 112. For example, the gateway 110 may enable transmission of data (e.g., system device data, activation signals, etc.) from the event devices 106 to the computing device 102 and/or the mobile device 112 via the control panel 108 and vice versa.

The facility can further include an environmental monitoring system (EMS) 104. An environmental monitoring system can include device(s) that monitor and/or detect a condition in an area. For example, an environmental monitoring system may include sensors or other devices that can detect an event that occurs (e.g., a door opening, a window being shut, a temperature of a space, a flow rate of an air duct, etc.). In some examples, an environmental monitoring system can include a building management system (BMS). As used herein, the term "building management system" refers to a computing-based automation and control system utilized in a facility to monitor, regulate, and/or control the facility's electrical and mechanical equipment, including power, lighting, and ventilation, among other types of equipment in a facility. The building management system can utilize a building information model having data associated with a facility (e.g., data associated with components, equipment, and/or properties of the facility). For example, building information model data can include data from devices associated with components and/or equipment associated with architectural, mechanical, electrical plumbing, sanitary, and/or any other systems in the facility. Additionally, building information model data can include architectural, mechanical, electrical, plumbing, sanitary, fire, and/or geometrical information associated with a building via various floor plans of the facility, and can be represented in two-dimensional (2D) plans and/or three-dimensional (3D) plans.

Further included in the system 100 is the mobile device 112. The mobile device 112 can be utilized by an occupant of the facility, such as a building manager, engineer, maintenance personnel, etc.

As illustrated in FIG. 1, the event devices 106 can be connected to the computing device 102 and/or the mobile device 112 (e.g., via the control panel 108 and gateway 110). Additionally, the EMS 104 can be connected to the computing device 102 and/or the mobile device 112. Such devices can be connected via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

In order to generate an optimization analysis, the computing device 102 can receive building system information from various entities in the system 100. As used herein, the term "building system information" refers to data associated with operation of a facility. Building system information can be received from the event devices 106, the EMS 104, and/or from the mobile device 112, as is further described herein.

The computing device 102 can receive building system information from the event devices 106. For example, the event devices 106 can transmit building system information to the computing device via the control panel 108 and the gateway 110. The building system information from the event devices 106 can include any data measurable by the event devices 106. For example, the data from the event devices 106 can include pre-alarm data prior to an event device 106 detecting an event, alarm data after an event device 106 detects an event, operational data not associated with an event, spike events, etc. For example, pre-alarm data can include detector data relative to a detection threshold, A to D values from the event device 106, etc. For instance, event device 106-1 can be a heat detector and transmit, to the computing device 102, a heat level (e.g., a temperature) relative to a threshold temperature to the computing device 102. Additionally, event device 106-2 can be a smoke detector and transmit a smoke level relative to a threshold smoke amount, event device 106-3 can be a CO detector and transmit a CO level relative to a threshold amount, etc.

Additionally, in response to an event device 106 detecting an event, the event devices 106 can transmit building system information that includes alarm data to the computing device 102 after an event device 106 detects an event. For example, the event device 106-1 may detect an event (e.g., a detected temperature exceeds a threshold temperature), and the event device 106-1 can transmit the alarm data (e.g., the detected temperature) to the computing device 102.

The computing device 102 can additionally receive building system information from the EMS 104 of the facility. As mentioned above, building system information from the EMS 104 can include environmental information such as information from devices as well as building information model data from devices associated with components and/or equipment associated with architectural, mechanical, electrical plumbing, sanitary, and/or any other systems in the facility, as well as information associated with floor plans of the facility. Such building system information from the EMS 104 of the facility can provide environmental data about the facility in addition to information detected by the event devices 106. For example, building system information from the EMS 104 can provide contextual information about what was going on in a space prior to and when an event is detected. For instance, if event device 106-2 is an air quality sensor that detects a drop in air quality, the building system information from the EMS 104 can provide contextual information that a door to the space was left open (e.g., via a door sensor connected to the EMS 104) that may have allowed dirty air to interact with the event device 106-2. Such information can allow the computing device 102 to determine steps to take regarding an optimization analysis via a machine-learning model, as is further described herein.

The building system information can further include classification data about an event detected by event devices 106. For example, in response to an event being detected by an event device 106, a query can be transmitted to the mobile device 112 which can allow for a user to provide an input to the mobile device 112 about the event type. Accordingly, the classification data can be organized by event type according to the user input. For example, event device 106-1 may detect an event and the user of the mobile device 112 can determine that the detected event is an unwanted alarm event or a real event. The query provided to the user of the mobile device can allow the user to specify whether the event is an unwanted alarm event or a real event. Upon providing an input to the mobile device 112 that the detected event is an unwanted alarm event, the mobile device 112 can classify that detected event as an unwanted alarm event and transmit such information to the computing device 102 as building system information.

As mentioned above, the event types may include an unwanted alarm event and/or a real event. Unwanted alarm events can be events in which an environmental condition is created (intentionally or unintentionally) that an event device is designed to detect but is not an emergency. Such unwanted alarm events can be, for example, nuisance events, false alarm events, etc. For example, an occupant may burn toast in an office kitchen. While smoke generated by the burned toast is unintentional and may cause an event device 106 to trigger, such an event is not an emergency and may be considered an unwanted alarm event.

Another example of an unwanted alarm event can be a false alarm event. For example, an event device 106 may be a heat detector that is located proximate to a steam pipe (e.g., either erroneously or due to poor event system design), where when a temperature of the steam pipe is high enough (e.g., intentionally due to facility operations) such that the event device 106 detects the heat generated by the steam pipe, the event device 106 may erroneously trigger. The event device optimization analysis, according to the present disclosure, can provide a facility manager or other user options to make various changes in the facility to try and prevent unwanted alarm events, such as nuisance events and false alarm events, using the building system information, as is further described herein.

Further, the event types may also include a real event. As used herein, the term "real event" refers to an emergency event. For example, an event device 106 may be a smoke detector that detects smoke generated by a fire in the facility. The event device optimization analysis, as is further described herein, can provide occupants of the facility confidence that the fire in the facility is properly detected and occupants warned in a timely manner to allow for safe emergency procedures to occur.

As described above, the computing device 102 can receive building system information from the event devices 106 (e.g., including pre-alarm data and alarm data), the mobile device 112 (e.g., including classification data about an event, past events, etc.), and from the EMS 104 (e.g., including environmental information data). The computing device 102 can generate an event device optimization analysis via a machine-learning model using the building system information from the event devices 106, the EMS 104, and/or the mobile device 112.

The machine-learning model can be an algorithm that utilizes sample data (e.g., training data) to generate a rule set that allows the algorithm to make predictions on new data fed to the model. For example, the computing device 102 can utilize the received building system information to generate the event device optimization analysis in order to determine optimal detection states for detectors of event devices, whether alternative event device types may be more suitable, whether alternative engineering configurations may be more suitable, whether to unlock detector features that may be locked for use, and/or combinations thereof. For example, utilizing building system information, the computing device 102 (e.g., via the machine-learning model) can select event device 106-1, as the building system information may indicate that event device 106-1 may be optimized by modifying a detection state of the detector of event device 106-1, that an alternative event device type may be more suitable in a location in the facility at which event device 106-1 is located, that an alternative engineering configuration for the event device 106-1 may be more desirable, and/or whether to unlock a detector feature in an event device, as is further described herein. Further, the machine-learning model can determine a propensity rating for the more event device optimization analysis options for consideration for a user utilizing the building system information, past event device optimization analyses, and/or past inputs in response to the past event device optimization analyses, as is further described herein.

In one example, generating the event device optimization analysis can include determining an optimal detection state for a detector of the event device 106-1 via the machine-learning model. In some examples, event device 106-1 can include multiple operational states, each having sensitivity levels that can vary within each state. For instance, the event device 106-1 can be a detector that can detect multiple fire phenomena, such as heat and CO (e.g., the event device 106-1 can be a dual optical heat CO detector). Such a device type may have a higher sensitivity than, for instance, a device that detects a single fire phenomenon (e.g., a smoke detector). The machine-learning model can determine that the event device 106-1 detects too many false alarm events because the event device 106-1 is located too proximate to a steam pipe in a space in the facility with engine exhaust being emitted, allowing the event device 106-1 to detect the heat from the pipe and the exhaust to interact with the event device 106-1. In such an instance, the machine-learning model can determine that the detection state of the event device 106-1 may be modified and/or the sensitivity level within the detection state can be modified (e.g., turned down) to prevent the event device 106-1 from activating in an instance when the pipe is hot and exhaust fumes are emitted.

Additionally, the event device optimization analysis can include a propensity rating surrounding the proposed detection state and/or optimal sensitivity level. For example, the machine-learning model can determine that turning down the sensitivity level for the dual optical heat CO detector device would have a 60% propensity rating for the likelihood of preventing the event device 106-1 from activating in an instance when the pipe is hot and exhaust fumes are emitted.

In another example, the event device 106-1 can be a device that detects a single event phenomenon. the machine-learning model can determine that the event device 106-1 detects many false alarm events because the event device 106-1 is an air quality sensor located too proximate to a door that is constantly being utilized (e.g., being opened), allowing unclean air to consistently interact with the event device 106-1. In such an instance, the machine-learning model can determine that the detection state of the event device 106-1 may be turned down to prevent the event device 106-1 from activating from so many false alarms.

Additionally, the event device optimization analysis can include a propensity rating surrounding the proposed optimal sensitivity level. For example, the machine-learning model can determine that turning down the sensitivity level for the air quality sensor would have an 80% propensity rating for the likelihood of preventing the event device 106-1 from activating in an instance when the door is opened and unclean air interacts with the event device 106-1.

In another example, generating the event device optimization analysis can include determining an alternative event device type for event device 106-1 via the machine-learning model. For example, the event device 106-1 can be a heat detector which may be located too proximate to a steam pipe (e.g., the temperature of which is provided to the computing device 102 via the building system information), and the machine-learning model can determine that the event device 106-1 detects too many false alarm events because the event device 106-1 unintentionally detects the heat from the steam pipe. In such an instance, the machine-learning model can determine that the event device type for event device 106-1 (e.g., a heat device) should be replaced with an alternative event device type, such as a smoke detector event device. Accordingly, the smoke detector event device would provide fire detection capabilities without being triggered by the heat of the proximate steam pipe.

Additionally, the event device optimization analysis can include a propensity rating surrounding the proposed alternative event device type. For example, the machine-learning model can determine that changing the heat detector to a smoke detector would have a 98% propensity rating for the likelihood of preventing the event device 106-1 from activating in an instance when the pipe is hot.

In a further example, generating the event device optimization analysis can include determining an alternative engineering configuration for event device 106-1 via the machine-learning model. Similar to the previous example, the event device 106-1 can be a heat detector which may be located too proximate to a steam pipe (e.g., the temperature of which, determined by a sensor, is provided to the computing device 102 via the building system information from the EMS 104), and the machine-learning model can determine that the event device 106-1 detects too many false alarm events because the event device 106-1 unintentionally detects the heat from the steam pipe. In such an instance, the machine-learning model can determine that event device 106-1 (e.g., a heat device) should include a co-incidence detection mechanism such that the event device 106-1 does not activate, even when an event is detected (e.g., a temperature is detected that exceeds a threshold temperature), unless event device 106-2 also detects the event. For example, if event device 106-1 detects the event, and event device 106-2 is also a heat detector that detects the heat and is not located proximate to the steam pipe, the event devices 106-1 and 106-2 can activate. As another example, if event device 106-1 detects the event, and event device 106-2 is a smoke detector that detects smoke, the event devices 106-1 and 106-2 can activate. As a further example, if event device 106-1 detects the event, and event device 106-2 is also a heat detector that does not detect the heat and is not located proximate to the steam pipe, the event devices 106-1 and 106-2 will not activate.

Additionally, the event device optimization analysis can include a propensity rating surrounding the proposed alternative engineering configuration. For example, the machine-learning model can determine that including co-incidence detection would have a 95% propensity rating for the likelihood of preventing the event device 106-1 from activating in an instance when the pipe is hot.

While determining an alternative engineering configuration is described above as including co-incidence detection, embodiments of the present disclosure are not so limited. For example, alternative engineering configurations can also include day night detection modules, alarm delay processes, etc.

In a further example, generating the event device optimization analysis can include determining whether to unlock a detector feature of the event device 106-1 via the machine-learning model. For instance, the event device 106-1 can be a detector that can detect multiple fire phenomena, such as heat and CO (e.g., the event device 106-1 can be a dual optical heat CO detector). However, the firmware of the event device 106-1 may allow only the heat detector to be utilized. The machine-learning model can determine that the event device 106-1 detects too many false alarm events utilizing only the heat detector because the event device 106-1 is located too proximate to a steam pipe, allowing the event device 106-1 to detect the heat from the pipe. In such an instance, the machine-learning model can determine that the CO detector feature of the event device 106-1 may be unlocked for use so that in order for the event device 106-1 to activate, the event device 106-1 has to detect both heat and CO. Such a feature unlock can prevent the event device 106-1 from activating in an instance when the pipe is hot.

Additionally, the event device optimization analysis can include a propensity rating surrounding the proposed feature unlock. For example, the machine-learning model can determine that unlocking the locked feature would have a 85% propensity rating for the likelihood of preventing the event device 106-1 from activating in an instance when the pipe is hot.

Additionally, while generating the event device optimization analysis is described above as including determining an optimal detection state, determining an alternative event device type, and determining an alternative engineering configuration, embodiments of the present disclosure are not so limited. For example, generating the event device optimization analysis can further include determining that another event device should be included, the location of the event device in the facility should be changed, etc. Further, the event device optimization analysis may include a combination of an optimal detection state, alternative event device type, and alternative engineering configuration. For instance, the event device optimization analysis may include changing the sensitivity of the detector of the event device 106-1 with a propensity rating of 60%, and an alternative event device type for the event device 106-1 with a propensity rating of 98%. Accordingly, a user reviewing the event device optimization analysis may utilize the propensity rating as a factor in determining which approach to take to reduce false alarm events for the event device 106-1 surrounding the steam pipe.

Upon generating the event device optimization analysis, the computing device 102 can transmit the event device optimization analysis to another computing device. For example, the computing device 102 can transmit the event device optimization analysis to the mobile device 112 and/or any other computing device to cause the event device optimization analysis to be displayed via a user interface.

For example, the mobile device 112 can include a user interface that can display the event device optimization analysis received from the computing device 102. The event device optimization analysis can be utilized to do various things, as is further described herein.

The event device optimization analysis can include a report. The report can summarize the event device optimization analysis, including event devices 106 of interest, possible recommendations for the event devices 106, etc.

In some examples, the report can include a recommendation to change a detection state of the detector of an event device 106 to an optimal detection state. For example, the event device 106-1 may be an air quality sensor having a sensitivity level 8. The event device optimization analysis can determine an optimum sensitivity level to be 7 based on the event device 106-1 having too many false alarms (e.g., from being exposed to unclean air from a door consistently being left open), and can include a recommendation to change the sensitivity level from sensitivity level 8 to the optimum sensitivity level (e.g., sensitivity level 7). Additionally, the event device optimization analysis can include a propensity rating associated with the recommendation to change the detection state.

In some examples, the report can include a recommendation to change the event device 106 to an alternative event device type. For example, the event device 106-1 may be a heat detector located too proximate to a steam pipe. The event device optimization analysis can determine the heat detector detects too many false alarm events because the event device 106-1 unintentionally detects the heat from the steam pipe, and can determine that the event device type for event device 106-1 should be replaced with a smoke detector event device type. The report can accordingly include the recommendation to change the event device 106-1 from a heat detector to a smoke detector. Additionally, the event device optimization analysis can include a propensity rating associated with the recommendation to change the event device 106 to an alternative event device type.

In some examples, the report can include a recommendation to change the engineering configuration for the event device 106 to an alternative engineering configuration. For example, the event device 106-1 may be a heat detector located too proximate to a steam pipe. The event device optimization analysis can determine the heat detector detects too many false alarm events because the event device 106-1 unintentionally detects the heat from the steam pipe, and can determine that the event device 106-1 (e.g., a heat device) should include a co-incidence detection mechanism such that the event device 106-1 does not activate, even when an event is detected (e.g., a temperature is detected that exceeds a threshold temperature), unless event device 106-2 also detects the event. The report can accordingly include the recommendation to include an alternative engineering configuration for the event device 106-1. Additionally, the event device optimization analysis can include a propensity rating associated with the recommendation to change the engineering configuration of the event device 106 to an alternative engineering configuration.

In some examples, the report can include a recommendation to unlock the detector feature in the event device 106. For example, the event device 106-1 may be a combination heat and CO detector with the CO detector being locked in the firmware of the event device 106-1, where the event device 106-1 is located too proximate to a steam pipe. The event device optimization analysis can determine the heat detector detects too many false alarm events because the event device 106-1 unintentionally detects the heat from the steam pipe, and can determine that the event device 106-1 (e.g., a heat device) should have the CO detection feature unlocked such that the event device 106-1 does not activate, even when an event is detected by the heat detector (e.g., a temperature is detected that exceeds a threshold temperature), unless the CO detector also detects the event (e.g., CO associated with an event). The report can accordingly include the recommendation to unlock the detector feature for the event device 106-1. Additionally, the event device optimization analysis can include a propensity rating associated with unlocking the detector feature of the event device 106.

In some examples, the computing device 102 can cause the event device 106-1 to change the detection state. For example, the report including the recommendation to change the detection state of the detector of an event device 106 to an optimal detection state can include a query displayed to a user (e.g., via the mobile device 112) as to whether to accept the recommendation or not. In response to an input to the mobile device 112 accepting the recommendation to change the detection state of the detector, the computing device 102 can cause the event device 106-1 to change the detection state of the detector to the optimal detection state. For instance, the computing device 102 can transmit a signal to the event device 106-1 that can modify the firmware of the event device 106-1 causing the detection state of the detector of the event device 106-1 to change.

While the computing device 102 is described above as changing the detection state of the detector of an event device 106 in response to a user input, embodiments of the present disclosure are not so limited. For example, the computing device 102 can, in some instances, cause the detector to change the detection state to the optimal detection state automatically based on the event device optimization analysis. For example, based on the event device optimization analysis indicating a change in the detection state of the detector, the computing device 102 can cause the event device 106-1 to change the detection state of the detector to the optimal detection state. For instance, the computing device 102 can transmit a signal automatically to the event device 106-1 that can modify the firmware of the event device 106-1 causing the detection state of the detector of the event device 106-1 to change to the optimal detection state determined by the event device optimization analysis.

Additionally, in some examples the computing device 102 can cause the event device 106-1 to change the engineering configuration to an alternative engineering configuration. For example, the report including the recommendation to change the engineering configuration of the detector of an event device 106 to an alternative engineering configuration can include a query displayed to a user (e.g., via the mobile device 112) as to whether to accept the recommendation or not. In response to an input to the mobile device 112 accepting the recommendation to change the engineering configuration of the event device 106, the computing device 102 can cause the event device 106-1 to change the engineering configuration of the detector to an alternative engineering configuration. For instance, the computing device 102 can transmit a signal to the event device 106-1 that can modify the firmware of the event device 106-1 causing the engineering configuration of the detector of the event device 106-1 to change.

Further, while the computing device 102 is described above as changing the engineering configuration of the detector of an event device 106 in response to a user input, embodiments of the present disclosure are not so limited. For example, the computing device 102 can, in some instances, cause the detector to change the engineering configuration to the alternative engineering configuration automatically based on the event device optimization analysis. For example, based on the event device optimization analysis indicating a change in the engineering configuration of the detector, the computing device 102 can cause the event device 106-1 to change the engineering configuration of the detector to the alternative engineering configuration. For instance, the computing device 102 can transmit a signal automatically to the event device 106-1 that can modify the firmware of the event device 106-1 causing the engineering configuration of the detector of the event device 106-1 to change to the alternative engineering configuration determined by the event device optimization analysis.

Moreover, in some examples the computing device 102 can cause the event device 106-1 to unlock the detector feature. For example, the report including the recommendation to unlock the detector feature in an event device 106 can include a query displayed to a user (e.g., via the mobile device 112) as to whether to accept the recommendation or not. In response to an input to the mobile device 112 accepting the recommendation to unlock the detector feature of the event device 106, the computing device 102 can cause the event device 106-1 to unlock the detector feature. For instance, the computing device 102 can transmit a signal to the event device 106-1 that can modify the firmware of the event device 106-1 causing the detector feature to be unlocked.

Further, while the computing device 102 is described above as unlocking the detector feature of the detector of an event device 106 in response to a user input, embodiments of the present disclosure are not so limited. For example, the computing device 102 can, in some instances, cause the detector to unlock the detector feature automatically based on the event device optimization analysis. For example, based on the event device optimization analysis indicating the detector feature should be unlocked, the computing device 102 can cause the event device 106-1 to unlock the detector feature. For instance, the computing device 102 can transmit a signal automatically to the event device 106-1 that can modify the firmware of the event device 106-1 causing the detector feature of the event device 106-1 to be unlocked.

As mentioned above, the computing device 102 can generate the event device optimization analysis via a machine-learning model using building system information. Such information can be received from various sources, as is additionally described in connection with FIG. 2.

Figure 2:
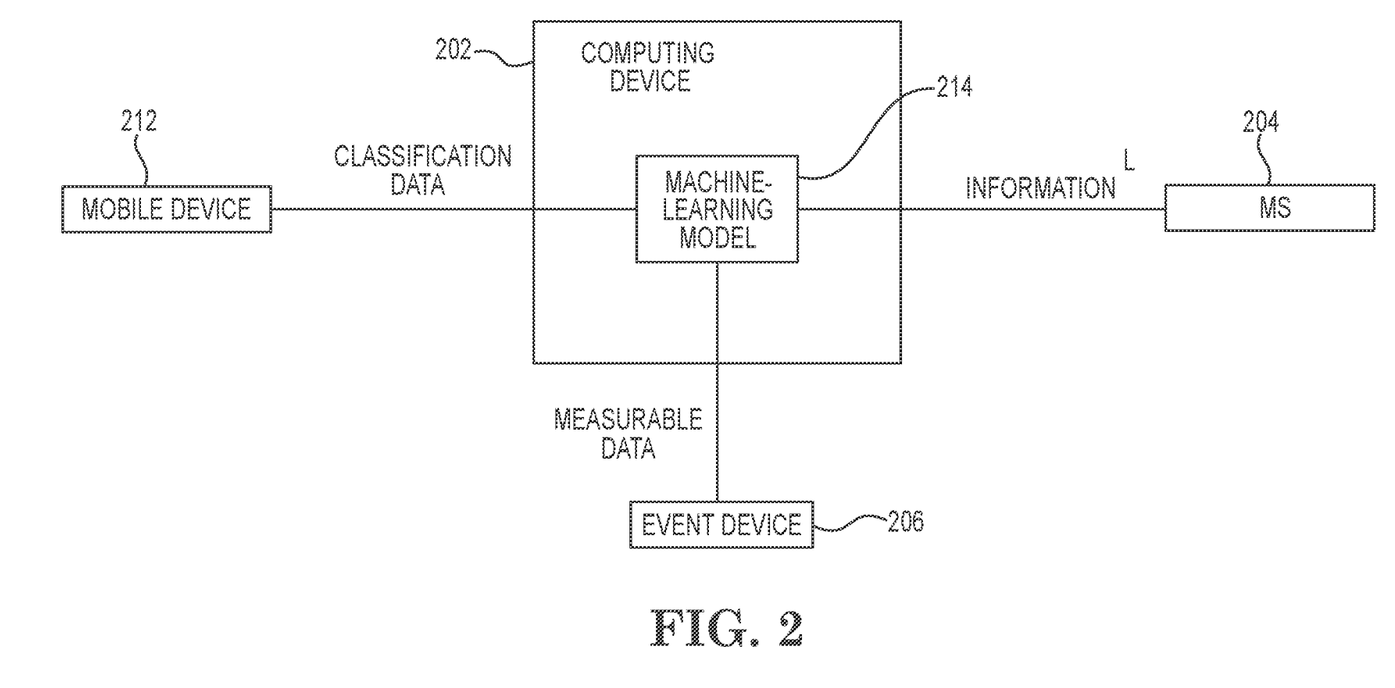
FIG. 2 is an example of a computing device having a machine-learning model for generating an event device optimization analysis in an event system, in accordance with one or more embodiments of the present disclosure.

FIG. 2 is an example of a computing device 202 having a machine-learning model 214 for generating an event device optimization analysis in an event system, in accordance with one or more embodiments of the present disclosure. The computing device 202 can receive building system information from a BMS 204, event device 206, and a mobile device 212.

As previously mentioned in connection with FIG. 1, the computing device 202 can utilize the machine-learning model 214 to generate the event device optimization analysis. The computing device 202 can further generate the machine-learning model 214 in order to generate such an optimization analysis. For example, the computing device 202 can utilize training data comprised of site data from the facility, and/or test data to generate decision rules for generating the event device optimization analysis. Such decision rules can be generated based on the training and test data, and can be utilized when generating the event device optimization analysis. For example, the training and test data can inform a decision rule such that under certain circumstances (e.g., if an event device encounters an unwanted alarm event over a threshold number of times under certain environmental conditions, which may be determined based on building system information from the BMS 204), a recommendation with respect to detection state, alternative event device type, alternative engineering configurations, and/or unlocking of detector features can be generated.

As illustrated in FIG. 2, the computing device 202 can receive building system information including pre-alarm data and alarm data from an event device 206. The pre-alarm data can be data from the event device 206 prior to detecting an event. Additionally, the alarm data can be data from the event device 206 after detecting an event.

Additionally, the computing device 202 can receive environmental information data from the EMS 204. Such data from the EMS 204 can include data from devices associated with components and/or equipment associated with architectural, mechanical, electrical plumbing, sanitary, and/or any other systems in the facility, as well as information associated with floor plans of the facility.

Further, the computing device 202 can receive classification data about an event detected by the event device 206 from the mobile device 212. For example, in response to an event being detected by the event device 206, a query can be transmitted to the mobile device 212 which can allow for a user to provide an input to the mobile device 212 about the event type. Such event types can include an unwanted alarm event and/or a real event.

The machine-learning model 214 included in the computing device 202 can receive the classification data, environmental information, the pre-alarm data, and/or the alarm data. Accordingly, the computing device 202 can generate the event device optimization analysis via the machine-learning model 214 using the above building system information, as previously described in connection with FIG. 1. Such information can be presented in a report, as previously described in connection with FIG. 1, and as is further illustrated in FIG. 3.

Figure 3:
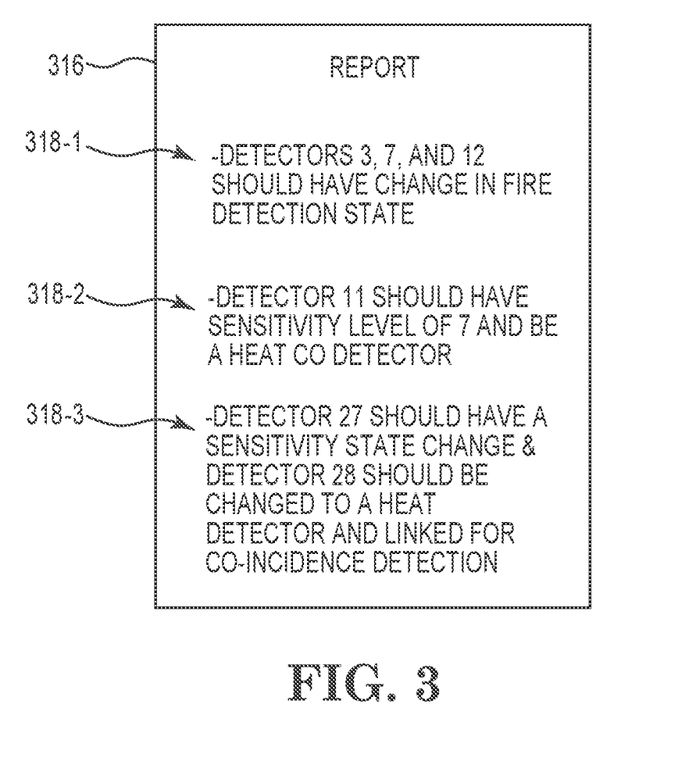
FIG. 3 is an example of a report in an event device optimization analysis, in accordance with one or more embodiments of the present disclosure.

FIG. 3 is an example of a report 316 in an event device optimization analysis, in accordance with one or more embodiments of the present disclosure. The report 316 can include various recommendations 318.

As previously described in connection with FIG. 1, the event device optimization analysis can include a report 316. The report 316 can summarize the event device optimization analysis, including event devices of interest, possible recommendations 318 for the event devices, etc.

For example, the report 316 can include a recommendation 318-1 for an optimal detection state for a detector of an event device. For instance, the recommendation 318-1 can include detectors 3, 7, and 12 should have a change in fire detection state.

Additionally, the report 316 can include a recommendation 318-2 for an alternative event device type for the event device. For instance, the recommendation 318-2 can include detector 11 should include a sensitivity level change to sensitivity level 7 and be a heat and/or CO detector.

Further, the report 316 can include a recommendation 318-3 for an alternative engineering configuration for the event device. For instance, the recommendation 318-3 can include detectors 27 and 28 should be linked for co-incidence detection, and detector 27 should have a sensitivity state change.

As previously mentioned in FIG. 1, the report 316 and the recommendations 318 can be transmitted to a mobile device of a user. The mobile device can provide a query to the user as to whether to accept such recommendations 318.

For example, the mobile device can provide a query to the user as to whether to accept the recommendation 318-1. In response to the mobile device receiving the input accepting the recommendation for the optimal detection state, the computing device can generate a revised report 316. The revised report 316 can include a task to change the detection state to the optimal detection state. Such revised reports 316 may be generated and displayed to a user when the computing device does not modify the detection state (e.g., in response to a user input or automatically without user input).

Similarly, the mobile device can provide a query to the user as to whether to accept the recommendation 318-2. In response to the mobile device receiving the input accepting the recommendation for the change to an alternative event device type, the computing device can generate a revised report 316. The revised report 316 can include a task to change the type of event device to the alternative event device type.

Lastly, the mobile device can provide a query to the user as to whether to accept the recommendation 318-3. In response to the mobile device receiving the input accepting the recommendation to link detectors 27 and 28, the computing device can generate a revised report 316. The revised report 316 can include a task to link detectors 27 and 28. Such revised reports 316 may be generated and displayed to a user when the computing device does not link detectors 27 and 28 (e.g., in response to a user input or automatically without user input).

Accordingly, generating an event device optimization analysis in an event system according to the disclosure can allow for the optimization of event devices in an event system. Such an approach can utilize existing building information to build a machine-learning model that can provide comprehensive analytical information for more active management of an event system in a facility, promoting safer and less costly event detection processes in the facility, as compared with previous approaches.

Figure 4:
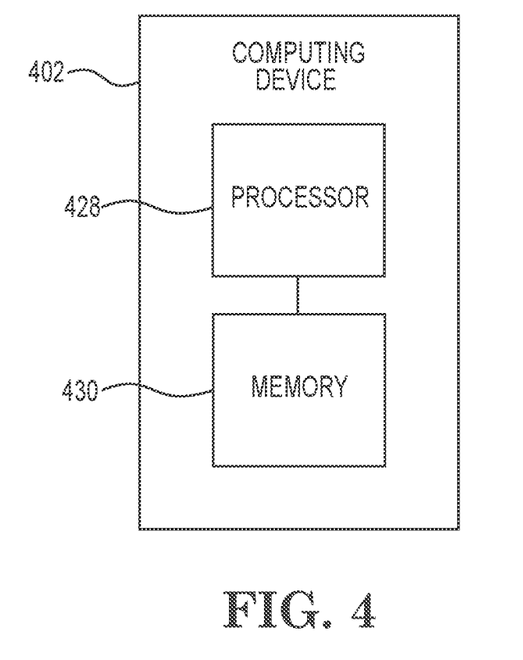
FIG. 4 is an example of a computing device for generating an event device optimization analysis in an event system, in accordance with one or more embodiments of the present disclosure.

FIG. 4 is an example of a computing device 402 for generating an event device optimization analysis in an event system, in accordance with one or more embodiments of the present disclosure. As illustrated in FIG. 4, the computing device 402 can include a memory 430 and a processor 428 for generating an event device optimization analysis in an event system, in accordance with the present disclosure.

The memory 430 can be any type of storage medium that can be accessed by the processor 428 to perform various examples of the present disclosure. For example, the memory 430 can be a non-transitory computer readable medium having computer readable instructions (e.g., executable instructions/computer program instructions) stored thereon that are executable by the processor 428 for generating an event device optimization analysis in an event system in accordance with the present disclosure.

The memory 430 can be volatile or nonvolatile memory. The memory 430 can also be removable (e.g., portable) memory, or non-removable (e.g., internal) memory. For example, the memory 430 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 430 is illustrated as being located within computing device 402, embodiments of the present disclosure are not so limited. For example, memory 430 can also be located internal to another computing resource (e.g., enabling computer readable instructions to be downloaded over the Internet or another wired or wireless connection).

The processor 428 may be a central processing unit (CPU), a semiconductor-based microprocessor, and/or other hardware devices suitable for retrieval and execution of machine-readable instructions stored in the memory 430.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for generating an event device optimization analysis in an event system, comprising:
    a memory; and
    a processor configured to execute executable instructions stored in the memory to:
        receive building system information from a plurality of event devices of the event system in a facility;
        generate an event device optimization analysis via a machine-learning model using the building system information from the plurality of event devices, wherein the event device optimization analysis includes:
            an optimal detection state and optimal sensitivity level for a detector of an event device of the plurality of event devices; and
            a propensity rating surrounding the optimal sensitivity level; and
        cause the event device optimization analysis to be displayed via a user interface.

2. The computing device of claim 1, wherein generating the event device optimization analysis includes determining the optimal detection state for the detector of the event device of the plurality of event devices via the machine-learning model.

3. The computing device of claim 1, wherein generating the event device optimization analysis includes determining an alternative event device type for the event device of the plurality of event devices via the machine-learning model.

4. The computing device of claim 1, wherein generating the event device optimization analysis includes determining an alternative engineering configuration for the event device of the plurality of event devices via the machine-learning model.

5. The computing device of claim 1, wherein generating the event device optimization analysis includes determining, via the machine-learning model, a detector feature in the event device of the plurality of event devices that should be unlocked.

6. The computing device of claim 1, wherein the processor is configured to execute the instructions to generate the machine-learning model utilizing training data comprised of site data in the facility and test data to generate decision rules for generating the event device optimization analysis.

7. The computing device of claim 1, wherein the building system information includes data measured by the plurality of event devices.

8. The computing device of claim 1, wherein the building system information includes classification data about an event detected by the event device of the plurality of event devices.

9. A non-transitory computer readable medium having computer readable instructions stored thereon that are executable by a processor to:
    receive building system information from a plurality of event devices of an event system in a facility and an environmental monitoring system (EMS) of the facility;
    generate an event device optimization analysis via a machine-learning model using the building system information from the plurality of event devices and the EMS, wherein the event device optimization analysis includes a report including:
        an optimal detection state and an optimal sensitivity level for a detector of an event device of the plurality of event devices;
        a propensity rating surrounding the optimal sensitivity level;
        an alternative event device type for the event device;
        an alternative engineering configuration for the event device; and
        whether a detector feature in the event device should be unlocked; and
    cause the event device optimization analysis to be displayed via a user interface.

10. The computer readable medium of claim 9, wherein generating the event device optimization analysis includes generating a propensity rating for:
    the optimal detection state;
    the optimal sensitivity level;
    the alternative event device type;
    the alternative engineering configuration; and
    whether the detector feature should be unlocked.

11. The computer readable medium of claim 9, wherein the non-transitory computer readable instructions are executable by the processor to select the event device of the plurality of event devices via the machine-learning model.

12. The computer readable medium of claim 9, wherein the report includes a recommendation to at least one of:
    change a detection state of the detector of the event device to the optimal detection state;
    change the alternative event device type for the event device;
    change the alternative engineering configuration for the event device; and
    unlock the detector feature in the event device.

13. The computer readable medium of claim 12, wherein in response to receiving an input accepting the recommendation to change the detection state of the detector, the non-transitory computer readable instructions are executable by the processor to cause the detector to change the detection state to the optimal detection state.

14. The computer readable medium of claim 9, wherein the non-transitory computer readable instructions are executable by the processor to cause the detector to change a detection state to the optimal detection state based on the event device optimization analysis.

15. The computer readable medium of claim 9, wherein the non-transitory computer readable instructions are executable by the processor to cause the detector to change an activation condition for the event device based on the event device optimization analysis.

16. A system for generating an event device optimization analysis in an event system, comprising:
a plurality of event devices in a facility;
an environmental monitoring system (EMS) in the facility;
a computing device configured to:
receive building system information from the plurality of event devices and the EMS;
generate an event device optimization analysis via a machine-learning model using the building system information from the plurality of event devices and the EMS, wherein the event device optimization analysis includes a report including:
a recommendation for an optimal detection state and an optimal sensitivity level for a detector of an event device of the plurality of event devices;
a propensity rating surrounding the optimal sensitivity level;
a recommendation for an alternative event device type for the event device;
a recommendation for an alternative engineering configuration for the event device; and
a recommendation for whether a detector feature in the event device should be unlocked; and
transmit the event device optimization analysis to a mobile device; and
the mobile device configured to display the event device optimization analysis.

17. The system of claim 16, wherein in response to the mobile device receiving an input accepting the recommendation for the optimal detection state, the computing device is configured to generate a revised report including a task to change the detection state to the optimal detection state.

18. The system of claim 16, wherein in response to the mobile device receiving an input accepting the recommendation for the alternative event device type, the computing device is configured to generate a revised report including a task to replace the event device with an alternative event device of the alternative event device type.

19. The system of claim 16, wherein in response to the mobile device receiving an input accepting the recommendation for the alternative event device type, the computing device is configured to generate a revised report including a task to modify an engineering configuration for the event device.

20. The system of claim 16, wherein in response to the mobile device receiving an input accepting the recommendation for whether the detector feature should be unlocked, the computing device is configured to generate a revised report including a task to unlock the detector feature in the event device.

* * * * *